July 7, 1964  J. P. BRODERICK ETAL  3,140,384
STARTING BLOCK FOR ARC WELDING
Filed March 4, 1964
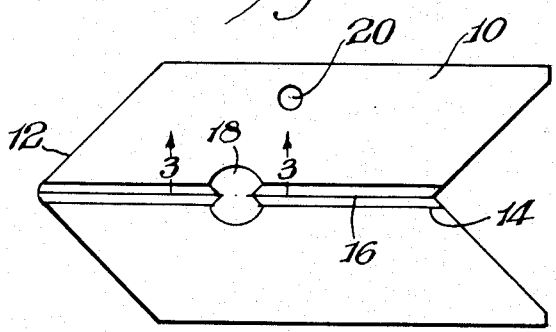
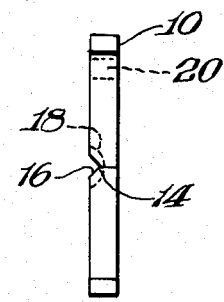
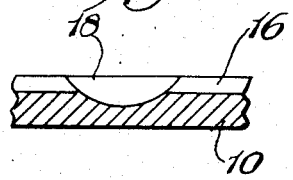
INVENTORS:
John P. Broderick
Joseph F. Quaas
BY *Connolly and Hutz*
ATTORNEYS

United States Patent Office 3,140,384
Patented July 7, 1964

3,140,384
STARTING BLOCK FOR ARC WELDING
John P. Broderick, Bayside, and Joseph F. Quaas, Island Park, N.Y., assignors to Eutectic Welding Alloys Corporation, Flushing, N.Y., a corporation of New York
Filed Mar. 4, 1964, Ser. No. 349,259
5 Claims. (Cl. 219—136)

This invention relates to a starting block for initiating a welding arc, and it more particularly relates to such a block for initiating the arc in a tungsten inert gas welding process.

In the tungsten inert gas welding process the arc is maintained between a "non-consumable" tungsten electrode and the eelctrically grounded workpiece. When using direct current particularly, physical contact between the tungsten electrode and the workpiece is necessary in order to establish the arc. Once this is accomplished, the tungsten electrode is withdrawn slightly to maintain the proper arc gap and welding progresses in the normal fashion. Frequently, the arc is not struck on the workpiece itself since it may scar the workpiece, and a starting block is used for initiating the arc. The starting blocks are also used in the manual arc welding process with coated electrodes. The starting blocks are sometimes simply a piece of scrap steel or copper so that the electrode will not become contaminated thus causing the arc to wander. These conventional starting blocks, however, cannot be brought into close proximity to the workpiece for all types of weld joints so as to minimize the gap necessary for the arc to bridge in moving from the starting block to the work.

With gas torches it is relatively easy to butt fuse stubs of filler wire to full length filler wires. However, this type of butt fusing is difficult with the tungsten inert gas welding process and the stubs are usually discarded when they are too short to hold.

Accordingly an object of this invention is to provide a convenient starting block for the tungsten inert gas welding process which can be brought into close proximity with the workpiece for a wide variety of joint designs.

A further object of this invention is to provide such a starting block which facilitates the butt welding of filler metal wires.

In accordance with this invention the starting block is made of electrically conductive material, such as copper, in the form of an arrowhead-shaped plate having approximately 90° external angle at its point and a 90° internal angle at its rear. The internal and external 90° angles are particularly useful in enabling the starting block to be closely placed against the workpiece for all types of joint designs. For example when welding a corner, either the external or the internal angle may be used in the corner without an air gap to span. Additionally, the external angle is particularly advantageous for inside fillet welds, while the internal angle is highly useful for edge welding.

Advantageously, the plate also has a groove extending across it with a deeper cavity in the plate across the groove, for facilitating the butt welding of two wires. In use, one of the wires, for example, a stub of filler wire, is positioned in the groove with one end over the cavity adjacent an end of a longer wire on the other side of the cavity; and the two ends are welded together. The groove is V-shaped to accurately position any size wire regardless of its diameter.

Novel features and advantages of the present invention will become apparent to one skilled in the art from a reading of the following description in conjunction with the accompanying drawings wherein similar reference characters refer to similar parts and in which:

FIG. 1 is a top plan view of one embodiment of this invention;
FIG. 2 is an end view in elevation of the embodiment shown in FIG. 1; and
FIG. 3 is a cross-sectional view in elevation taken through FIG. 1 along the line 3—3.

As shown in FIG. 1 the starting block is made of an electrically conductive plate 10, such as from copper, from a rectangular blank which is, for example 3/16 x 2 x 4 inches, and is then shaped to form an arrowhead. Plate 10 has an external angle at its point 12 of approximately 90° and an internal angle at its rear also of approximately 90°. A V-shaped groove 16 extends across the plate joining the apexes of the angles, and is for example, 1/16 inch deep with the legs of the V disposed at right angles to each other. Extending across groove 16 at a distance of for example, 1½ inches from the tip 12 and halfway between the ends of groove 16 is a cavity 18 which is, for example, circular in cross section having a diameter of 7/16 inch at the surface of plate 10 and a maximum depth of 3/32 inch so that it is wider and deeper than groove 16 as shown in FIGS. 2 and 3. Approximately midway across plate 10 and, for example, ¼ inch in from one edge of plate 10 is a hole 20 which is, for example, 3/16 inch in diameter. The starting block may be conveniently hung on a nail or peg through hole 20 or it may be carried by the operator by inserting a chain through hole 20 and fastening the chain to the operator's belt.

The high thermal conductivity of copper used in starting block 10 prevents adhesion of whatever weld metal is transferred and thus starting block 10 is easily cleaned by light chipping and/or brushing.

Starting block 10 is amazingly adaptable for a wide variety of joint designs by virtue of its unusual shape. For example when starting block 10 is used in welding a corner either external angle 12 or internal angle 14 can be positioned in close proximity to the pieces. The arc is established using the scratch technique and is then carried over to the joint to be welded with a minimum air gap. For inside fillet welds point 12 of plate 10 is held in the fillet at a low angle to provide effective intimacy of contact for efficient starting operation. For edge welds internal angle 14 enables starting block 10 to be brought into close proximity with the work piece.

Starting block 10 is also particularly effective with the manual arc welding process using coated electrodes. For example when the arc is started on starting block 10, there are no scars on the base metal. This is particularly important when welding high alloy heat and corrosion resisting metals where appearance is important. Additionally, since the arc is established on starting block 10, the weld bead attains proper fluxing before the arc is transferred to the work piece. Further when using starting block 10, the arc can be allowed to impinge on the starting block for a few seconds until the electrode temperature rises before transferring the arc to the weld start; thus the weld start is not excessively convex.

Starting block 10 is also particularly advantageous in butt welding ends of wires together. This is done by placing, for example, a short stub of filler metal wire in groove 16 with one end of the wire over cavity 18. The other or longer wire is then placed in the other portion of groove 16 with one end abutting against the wire stub over cavity 18 and the two ends are fused together. Advantageously, since the wires are placed directly on the starting block, there is no air gap to span when the arc is transferred to the wires. Additionally, since the wires come in a variety of diameters, for example from 1/16 to 5/32 inch in diameter, the V-shape of groove 16 accurately holds and positions long or short wires regardless of their diameters.

What is claimed is:

1. A starting block for arc welding comprising an arrowhead-shaped plate made of an electrically conductive material to facilitate the start of an arc, the external angle at the point of said arrowhead being approximately ninety degrees, the internal angle at the rear of said arrowhead being approximately ninety degrees whereby said plate may be brought into close proximity to a work piece with a portion of said plate against said work piece, a groove extending across said plate, a cavity in said plate extending across said groove intermediate the ends of said groove, said cavity being deeper and wider than said groove to facilitate the butt welding of two wires wherein each wire may be accurately positioned in said groove with abutting ends above said cavity whereby said wires are in close proximity to the arc immediately after said arc is started on said block, and said groove being V-shaped to accurately position wires of different diameters.

2. A starting block as set forth in claim 1 wherein said plate is made of copper.

3. A starting block as set forth in claim 1 wherein said groove extends from the apex of said external angle to the apex of said internal angle.

4. A starting block as set forth in claim 3 wherein said cavity is approximately midway between said ends of said groove.

5. A starting block as set forth in claim 1 wherein said plate has a hole therethrough to facilitate the storage of said starting block.

References Cited in the file of this patent

UNITED STATES PATENTS

| | | |
|---|---|---|
| 1,512,787 | Morton | Oct. 21, 1924 |
| 2,348,087 | Miller | May 2, 1944 |
| 2,352,716 | Jones | July 4, 1944 |
| 2,649,528 | Koenig et al. | Aug. 18, 1953 |
| 2,749,422 | Saives | June 5, 1956 |